United States Patent [19]

Heidel

[11] Patent Number: 4,904,963
[45] Date of Patent: Feb. 27, 1990

[54] STAGGERED QUADRATURE PHASE SHIFT KEYED LASER MODULATOR

[75] Inventor: Jeffrey R. Heidel, Red Bud, Ill.

[73] Assignee: McDonnell Douglas Corporation, Long Beach, Calif.

[21] Appl. No.: 271,882

[22] Filed: Nov. 16, 1988

[51] Int. Cl.[4] .......................... H01S 3/10; H04L 27/10
[52] U.S. Cl. ........................................ 330/4.3; 375/52; 375/54; 455/608; 455/611
[58] Field of Search .............. 332/7.51, 16 R; 375/52, 375/54, 67; 455/608, 611

[56] References Cited

U.S. PATENT DOCUMENTS

| | | | |
|---|---|---|---|
| 3,131,363 | 4/1964 | Landee et al. | 375/54 |
| 3,242,262 | 3/1966 | Melos et al. | 375/54 |
| 4,649,549 | 3/1987 | Halpern et al. | 375/106 |
| 4,725,844 | 2/1988 | Goodwin et al. | 342/374 |
| 4,773,084 | 9/1988 | Scholz | 375/67 |

OTHER PUBLICATIONS

Bozic et al.; "Design of a Digital PSK Modulator"; Int. J. Electr.; 2/82, vol. 52, #2, pp. 157-165.

*Primary Examiner*—Nelson Moskowitz
*Attorney, Agent, or Firm*—Oblon, Spivak, McClelland, Maier & Neustadt

[57] ABSTRACT

A staggered quadrature phase shift keyed modulator which avoids the need for timing circuits. Three phase modulators serially change the phase of a laser beam so that it may sequentially have a total phase shift of $\pi$, $\pi/2$, 0, $-\pi/2$. The input signal is divided into two pulse trains, one of which is delayed to provide the stagger. The two pulse trains are logically combined to form three control signals for the modulators.

9 Claims, 2 Drawing Sheets

4,904,963

STAGGERED QUADRATURE PHASE SHIFT KEYED LASER MODULATOR

BACKGROUND OF THE INVENTION

1. Field of the Invention

This invention relates generally to a laser modulator for communications and more particularly to a staggered quadrature phase shift keyed laser modulator for communications.

2. Discussion of the Background

In the field of communications great promise has been shown by the possibility of using optical carriers in place of electronic communications. Such optical communication systems in particular have the ability to carry a great many conversations over a much smaller cable than in traditional electronic systems. In order for these communication systems to reach their full potential, it has been necessary to develop various light modulation systems so that input electrical digital data may be sent across optical cables. Corresponding electronic systems have used a great many types of coding systems for the transmission of digital data. One such type of coding is the phase shift keyed modulation.

U.S. Pat. No. 4,338,579 to Rhodes shows such a frequency shift offset quadrature quaternary phase shift keyed transmission. This patent shows an electronic communication system which utilizes the sum of two quadrature carriers which are separately modulated and staggered in time by one half of a symbol interval. While this technique has many attributes, it requires the use of a clock system in order to gate the pulses. It also is directed for use in electronic systems rather than the preferable light communication system.

U.S. Pat. No. 3,956,626 to Ross shows a pulse quaternary communication system with a light communication system utilizing a pulse quadrature modulation technique. This system uses a combination of polarization and delays in order to code the light pulses. However, this system does not utilize phase shift keyed modulation.

U.S. Pat. No. 4,006,418 shows a phase shift keying quaternary communication system. Two quadrature signals are summed with one of the signals being delayed by a half bit so that four levels from $-135°$ to $+135°$ are possible. The output is applied to a microwave radiolink. The system also depends on a clocking system to provide for appropriate timing.

Various forms of phase shift keyed modulation systems have been developed for electronic systems. However, the application of these devices to optical communication systems has not been completely successful. Even with the electronic systems, clocks and other timing circuits are necessary in order to make the logic work properly.

SUMMARY OF THE INVENTION

Accordingly, one object of this invention is to provide a novel laser modulator utilizing staggered quadrature phase shift keyed systems.

Another object of this invention is to provide a novel laser communication system which does not require any timing circuits or oscillators in the laser phase modulators or their drivers.

Another object of this invention is to provide a novel optical modulator using a series of phase modulators for sequentially acting on a laser light beam.

Another object of this invention is to provide a novel staggered quadrature phase shift keyed modulation system which is reliable for any data rate within the band width of the device.

Briefly these and other objects of the invention are achieved by providing three phase modulators which sequentially act on a single laser light beam. Two of the phase modulators change the phase by $\pi/2$ while the third changes the phase by $-\pi/2$. The three modulators are controlled to give a total modulation at one of four relative levels, namely $-\pi/2$, $0$, $\pi/2$, $\pi$. The particular actuation signals for the modulators are derived from the input signal itself using a standard shift register.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
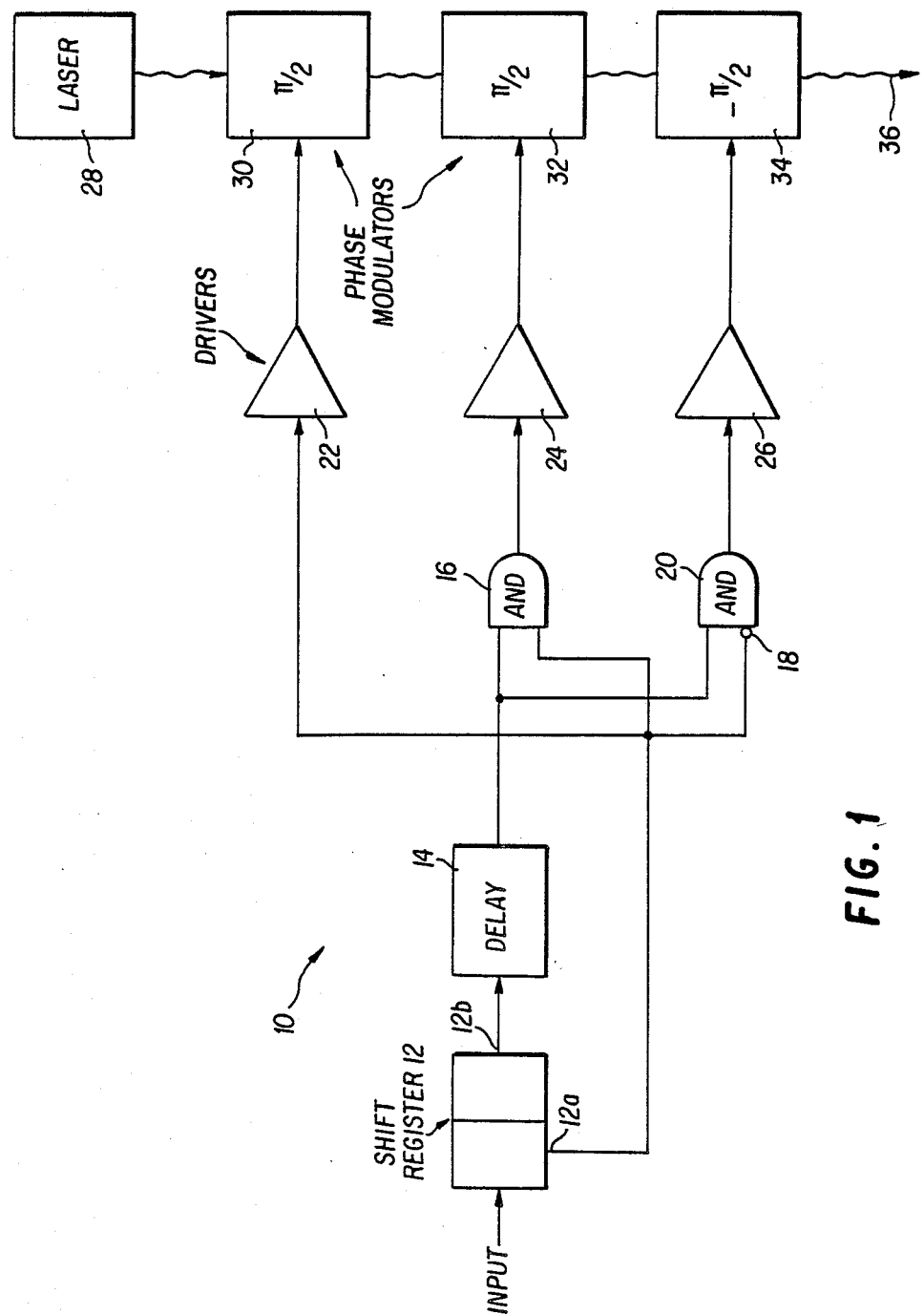
FIG. 1 is a block diagram of the present invention.

Various other objects features and attendant advantages of the present invention will be more fully appreciated as the same becomes better understood from the following detailed description when considered in connection with the accompanying drawings in which like reference characters designate like o corresponding parts throughout the several views and wherein FIG. 1 shows the overall arrangement of the invention as indicated by numeral 10. A digital pulse train is provided as an input to a standard shift register 12. The shift register acts as a serial to parallel converter for the incoming data stream. That is, the input data is shifted through the two stages of the shift register in such a manner that alternate data pulses form the output of each stage. Thus, the output 12a from the first stage includes alternating bits of the input data. Likewise, output 12b from the second stage includes the alternate bits not included in 12a. The two outputs from shift register 12 are seen in the top two lines of FIG. 2. Thus, for purposes of illustration the input bits are assumed to be 1, 0, 0, 1, 1, 0, 0, 1, 1, . . . . As seen in FIG. 1, alternate data bits are separated into the two pulse trains.

Pulse train 12b is then sent to delay device 14 which produces a new pulse train identical to the input pulse train but delayed by a time equal to one-half a bit period. This pulse train is seen in the third line of FIG. 2. The arrow above this line labeled T indicates the amount of delay time provided by delay 14. Clock signals (not shown) are provided to shift register 12 and delay 14 from a clock provided in the circuitry used to generate the original data stream (not shown). Pulse trains 12a and 14 are capable of supplying the timing to the logic circuit which follow, since this is a logic circuit designed to respond to pulse inputs so that the output changes as the input changes. Pulse train 12a is used to directly drive driver 22 which controls the first phase modulator 30. When a signal is present in this pulse train light traveling through the phase modulator is modulated by a phase of $\pi/2$. When no signal is present, the modulator has no effect on the light signal.

Pulse train 12a is logically combined with the delayed pulse train 14 in AND gate 16. The result of this logical combination is a pulse train having the same frequency but having individual pulses only half the width of the two original pulse trains. These pulses form the first half of each pulse of wave train 12a. This pulse train is shown in line 4 of FIG. 2. This pulse train is used to control driver 24 which controls phase modulator 32. This phase modulator acts to modulate the light beam by a phase angle of $\pi/2$ when a signal is present on the pulse train. When no signal is present, the modulator leaves the light beam unmodulated.

Figure 2:
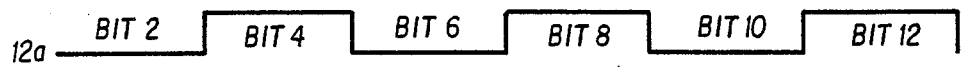
FIG. 2 is a timing diagram of various signals present in the invention shown in FIG. 1.
Figure 2:
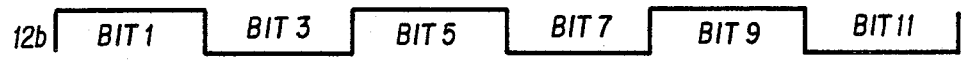
Figure 2:
Figure 2:
Figure 2:
Figure 2:
Figure 2:
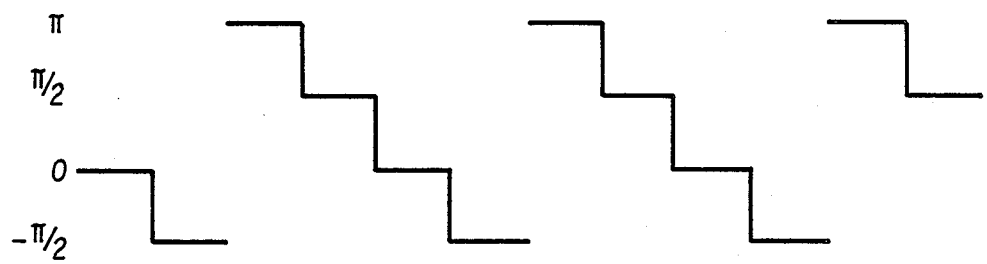

The pulse train 12a is inverted by the inverting input 18 to AND gate 20 to form the pulse train seen in the fifth line of FIG. 2. As can be seen, this is merely the inverse of line 1 of the same figure. The other input to the AND gate receives the delayed pulse train from delay 14. The logical combination of these two signals forms the pulse train seen in line 20 of FIG. 2. This pulse train has the same frequency as the other pulse trains and like the output from AND gate 16 has pulses that are half the pulse width of the original two pulse trains. The pulses in this pulse train immediately precede the pulses in the pulse train from AND gate 16. That is, the final edge of the pulses from AND gate 20 occur at the same time as the leading edge of the pulses from AND gate 16. The pulse train from AND gate 20 is used to control driver 26 which controls phase modulator 34. When a signal is present in this pulse train light passing through a phase modulator 34 is modulated by a phase shift of $-\pi/2$. When no signal is present the light beam is unmodulated.

Laser 28 is provided for producing the original light beam which passes sequentially through each of the phase modulators 30, 32 and 34. The output 36 from the last phase modulator may be then be used as an input to an optical communication link.

The total phase shift applied to the output light beam is equal to the sum of the phase shifts caused by each of the three phase modulators. As can be seen in FIG. 2 by comparing lines 1, 4 and 6 simultaneously, a certain sequence of phase shift is applied. Of these three pulse trains the first to be actuated is pulse train 20. This signal actuates phase modulator 34 to give a phase shift of $-\pi/2$. As this signal ends a pulse of the same size starts on pulse train 16 and a pulse of twice that width occurs on pulse train 12a. Thus, phase modulators 30 and 32 are both actuated at first to give a total phase shift of $\pi$. This is followed by a time when only phase modulator 30 is actuated thus giving a phase shift of $\pi/2$. This is followed by a time when no signals occur in any of the pulse trains and thus no phase shift occurs leaving the phase shift at 0. During the next time interval the same patter starts over again. This pattern is shown graphically in the last line of FIG. 2. Thus a recurring pattern f $-\pi/2$, $\pi$, $\pi/2$, 0, $\pi/2$ occurs. This may also be described in table form as follows:

| Pulse Train | | Modulator | | | Total |
| --- | --- | --- | --- | --- | --- |
| 14 | 12a | 30 | 32 | 34 | Phase |
| 0 | 0 | 0 | 0 | 0 | 0 |
| 0 | 1 | $\pi/2$ | 0 | 0 | $\pi/2$ |
| 1 | 0 | 0 | 0 | $-\pi/2$ | $-\pi/2$ |
| 1 | 1 | $\pi/2$ | $\pi/2$ | 0 | $\pi$ |

In actual practice, the length of the leads to each phase modulator should be the proper length so as to not to change the phase relationship between the lines.

As seen above, the present device solves a problem of driving a traveling wave modulator in order to perform staggered quadrature phase shift keying. The stagger is obtained by the use of the delay line 14. Thus, all signals which occur to the right of box 14 in FIG. 1 may be said to be staggered. This device does work very simply and the circuitry beyond the shift register and delay does not need timing since it is supplied by the pulse trains.

The invention has been described above in regard an input data stream of 1, 0, 0, 1, 1, 0, 0, 1, 1, 0, 0, . . . for purposes of illustration. Obviously, the input data may have a different sequence of signals.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United States is:

1. An optical modulator having an electronic signal input and an optical output comprising:
   a shift register receiving said input and producing a first output and a second output;
   a delay line connected to said first output to produce a delayed output;
   logic means connected to said delayed output said second output for producing a plurality of control signals;
   a plurality of optical phase modulators, each controlled by one of said control signals, which change the phase of light traveling therethrough;
   a light source producing a light beam which serially passes through each of said phase modulators to produce a phase shifted optical output.

2. The modulator of claim 1, wherein the number of phase modulators and control signals is 3.

3. The modulator of claim 1, wherein said logic means includes a driver connected between each control signal and its corresponding phase modulator.

4. The modulator of claim 1, wherein said shift register causes the input pulses to be alternately assigned to said first and second outputs.

5. The modulator according to claim 1, wherein said delay means causes a delay of one-half of one bit.

6. The modulator according to claim 1, wherein the modulation is a staggered quadrature phase shift keyed modulation.

7. The modulator according to claim 1, wherein said logic means includes a direct connection between said second output and a first control signal, a first AND gate having inputs connected to said delayed output and said second output to produce a second control signal, and a second AND gate having one input connected to said delayed output and a second input connected to said second output through an inverter to produce a third control signal.

8. A modulator according to claim 1, wherein a first phase modulator produces a phase shift of $\pi/2$, a second modulator produces a phase shift of $\pi/2$ and a third modulator produces a phase shift of $-\pi/2$.

9. A modulator according to claim 8, wherein the total phase shift applied to the light beam sequentially follows the pattern $\pi$, $\pi/2$, 0, $-\pi/2$ with each change occurring at one-half a bit period of the input signal.

* * * * *